United States Patent
Nishioka et al.

(10) Patent No.: US 8,638,669 B2
(45) Date of Patent: Jan. 28, 2014

(54) PATH CONTROL SYSTEM, PATH CONTROL DEVICE, PATH CONTROL METHOD, AND PROGRAM

(75) Inventors: Jun Nishioka, Tokyo (JP); Satoru Yamano, Tokyo (JP)

(73) Assignee: NEC Corporation, Tokyo (JP)

( * ) Notice: Subject to any disclaimer, the term of this patent is extended or adjusted under 35 U.S.C. 154(b) by 225 days.

(21) Appl. No.: 13/055,809

(22) PCT Filed: Aug. 4, 2009

(86) PCT No.: PCT/JP2009/063787
§ 371 (c)(1),
(2), (4) Date: Feb. 25, 2011

(87) PCT Pub. No.: WO2010/016477
PCT Pub. Date: Feb. 11, 2010

(65) Prior Publication Data
US 2011/0141897 A1 Jun. 16, 2011

(30) Foreign Application Priority Data
Aug. 5, 2008 (JP) ................................ 2008-201758

(51) Int. Cl.
*H04L 12/26* (2006.01)

(52) U.S. Cl.
USPC ...... 370/236; 370/238; 370/328; 370/395.21; 370/477; 375/219; 375/340; 375/347

(58) Field of Classification Search
USPC .......... 375/311, 316, 340, 236, 219; 709/219; 370/328, 477, 441, 238, 395.21
See application file for complete search history.

(56) References Cited

U.S. PATENT DOCUMENTS

| | | | |
|---|---|---|---|
| 6,363,319 B1 * | 3/2002 | Hsu .............................. | 701/533 |
| 7,751,360 B2 * | 7/2010 | Yagyu et al. ................. | 370/328 |
| 2004/0081260 A1 * | 4/2004 | Matsusaka .................... | 375/340 |
| 2006/0045132 A1 * | 3/2006 | Metke ........................... | 370/477 |
| 2008/0008257 A1 * | 1/2008 | Yonesi et al. ................. | 375/262 |
| 2008/0069275 A1 * | 3/2008 | Horiguchi et al. ........... | 375/347 |
| 2009/0177760 A1 * | 7/2009 | Gonzalez et al. ............ | 709/219 |
| 2009/0274199 A1 * | 11/2009 | Onodera et al. ............. | 375/219 |
| 2010/0027696 A1 * | 2/2010 | Lee et al. ..................... | 375/260 |

FOREIGN PATENT DOCUMENTS

| | | |
|---|---|---|
| JP | 10-190550 A | 7/1998 |
| JP | 11-168410 A | 6/1999 |
| JP | 2002290617 A | 10/2002 |
| JP | 2003069620 A | 3/2003 |
| JP | 2004072666 A | 3/2004 |
| JP | 2004363679 A | 12/2004 |

(Continued)

OTHER PUBLICATIONS

International Search Report for PCT/JP2009/063787 mailed Sep. 8, 2009.

(Continued)

*Primary Examiner* — Andrew Chriss
*Assistant Examiner* — Mohamed Kamara

(57) ABSTRACT

A path control system according to the present invention includes a network including a communication device (202) that communicates via a radio link that uses adaptive modulation, and a path control device (201) predicting a future modulation mode for the radio link and setting a communication path for the network based on a predicted mode that is the predicted modulation mode.

20 Claims, 6 Drawing Sheets

(56) References Cited

FOREIGN PATENT DOCUMENTS

| JP | 2005080001 A | 3/2005 |
|---|---|---|
| JP | 2006505221 A | 2/2006 |
| JP | 2006173711 A | 6/2006 |
| JP | 2006313992 A | 11/2006 |
| JP | 2006319900 A | 11/2006 |
| JP | 2007036405 A | 2/2007 |
| JP | 3898192 B | 3/2007 |
| JP | 2007529135 A | 10/2007 |
| JP | 2009049593 A | 3/2009 |

OTHER PUBLICATIONS

M. Kodialam et al., "Minimum Interference Routing with Applications to MPLS Traffic Engineering", IEEE INFOCOM 2000, 2000, pp. 884-893.

J. Sangiamwong et al., "QoS-based Adaptive Modulation under Rainfall Environment in Gigabit Millimeter-Wave Broadband Wireless Access System", IEEE RAWCON, M2A.2, 2003, pp. 19-22.

K. Kar et al, "Minimum Interference Routing of Bandwidth Guaranteed Tunnels with MPLS Traffic Engineering Applications", IEEE Journal on Selected Areas in Communications, vol. 18, No. 12, Dec. 2000. pp. 2566-2579.

* cited by examiner

PATH CONTROL SYSTEM, PATH CONTROL DEVICE, PATH CONTROL METHOD, AND PROGRAM

This application is the National Phase of PCT/JP2009/063787, filed Aug. 4, 2009, which is based upon and claims the benefit of priority from Japanese Patent Application No. 2008-201758 filed on Aug. 5, 2008, the content of which is incorporated by reference.

TECHNICAL FIELD

The present invention relates to a path control system, a path control device, and a path control method for a communication network configured to transmit data, as well as to a program for allowing a computer to carry out the method.

BACKGROUND ART

With the recent advancement of informatization, there has been a growing demand for data communication traffic for data communication. Thus, an increase in the communication bands of networks and a reduction in operation costs have been demanded.

Mobile phone networks and the like utilize a network formed of radio links, such as an FWA (Fixed broadband Wireless Access) network that uses a radio scheme utilizing frequencies such as in a millimeter waveband at which wideband transmission can be carried out.

FIG. 1 shows a graph of the correlation between the SNRs (Signal to Noise Ratios) and transmission rates of modulation modes. In the graph in FIG. 1, the axis of abscissas indicates the SNR, and the axis of ordinate indicates a bandwidth. The communication quality of the radio link varies depending on the SNR of the reception signal. Thus, much attention has been paid to an adaptive modulation technique in order to further increase the bandwidth of radio links.

The adaptive modulation technique adaptively finds and uses a modulation scheme with the highest transmission efficiency based on the status of radio communication via radio links. The adaptive modulation technique allows the optimum radio communication to be carried out in accordance with the radio environment. This enables frequency efficiency to be improved.

Provided that a modulation mode to be used by each radio link in the future can be predicted, the communication quality of traffic flowing through the network can be guaranteed. Examples of a method for predicting a modulation mode are disclosed in JP2006-505221A (hereinafter referred to as Document 1) and JP2004-363679A (hereinafter referred to as Document 2).

As disclosed in Document 1, a radio link using the adaptive modulation technique may have a certain level of correlation with the past history. Thus, the modulation mode to be used by the radio link can be predicted (estimated). Moreover, as shown in Document 2, the modulation mode can be predicted (estimated) by utilizing weather information.

An example of path control performed in a radio network is disclosed in M. S. Kodialam et al., "Minimum interference routing with applications to mpls traffic engineering", INFOCOM, 2000 (hereinafter referred to as Document 3).

If the path control disclosed in Document 3 is applied to an FWA network that uses the adaptive modulation technique, then unlike in the case of wired communication, the communication rate of the radio link will be varied by the adaptive modulation in connection with the path control. Thus, congestion or the like may occur to degrade the communication quality of traffic.

On the other hand, JP2006-313992A (hereinafter referred to as Document 4) proposes a load distribution technique for an FWA network that utilizes the adaptive modulation. A method disclosed in Document 4 is a scheme in which traffic is distributed among radio links in a plurality of routing paths for relay transmission. The use of this scheme allows the traffic to be distributed, enabling the utilization rate of the whole network to be improved.

However, in this scheme, packets may pass through different paths, resulting in possible jitter due to delay or the like. In this case, the scheme is not suitable for traffic such as VoIP (Voice over IP) for which communication quality needs to be guaranteed. Such traffic requires path control that allows the traffic to pass through the same path. Furthermore, if the scheme is utilized without any modification, since the path cannot be specified, it is difficult to estimate what degrees of priority will be required to maintain the quality of the traffic. As a result, maintaining and managing the communication quality of priority traffic is difficult.

An example of an existing technique with the path control taken into account is disclosed in J. Sangiamwong et al., "QoS-based adaptive modulation under rainfall environment in gigabit millimeter-wave broadband wireless access system," IEEE RAWCON, 2003 (hereinafter referred to as Document 5).

Document 5 proposes a path control scheme for an FWA network with an adaptive modulation function. The scheme proposed in Document 5 searches for a modulation mode and a path which are optimum for each flow. However, this scheme is path control based on the current radio link status. Thus, the modulation mode cannot be ensured to be maintained in the future. Furthermore, in each base station, the modulation mode is selected for each flow, disadvantageously resulting in a significant overhead.

As described above, a technique is required in which the modulation mode to be used by each radio link that is varied by the adaptive modulation is predicted or estimated to allow path control to be performed.

SUMMARY OF INVENTION

Since the adaptive modulation varies the transmission rate of the radio links, simple path control may disadvantageously degrade the communication quality of traffic flowing through the network.

An exemplary object of the present invention is to provide a path control system, a path control device, and a path control method all of which are designed to achieve high-quality communication in a network formed of links with a varying transmission rate, as well as a program executed by a computer.

A path control system according to an exemplary aspect of the invention comprises a network including a communication device that communicates via a radio link that uses adaptive modulation and a path control device predicting a future modulation mode for the radio link and setting a communication path for the network based on a predicted mode that is the predicted modulation mode.

Furthermore, a path control device according to an exemplary aspect of the invention comprises a modulation mode prediction section predicting a future modulation mode for a radio link that uses adaptive modulation in a network including a communication device that communicates via the radio link, and a path control section setting a communication path for the network based on a predicted mode that is the predicted modulation mode.

Furthermore, a path control method according to an exemplary aspect of the invention comprises predicting a future modulation mode for a radio link that uses adaptive modulation in a network including a communication device that communicates via the radio link, and setting a communication path for the network based on a predicted mode that is the predicted modulation mode.

Moreover, a program according to an exemplary aspect of the invention is executed by a computer setting a communication path for a network including a communication device that communicates via a radio link that uses adaptive modulation, and that allows the computer to carry out a process of predicting a future modulation mode for a radio link and setting a communication path for the network based on a predicted mode that is the predicted modulation mode.

DESCRIPTION OF EMBODIMENTS (First Exemplary Embodiment)

A path control device according to the present exemplary embodiment will be described.

Figure 1:
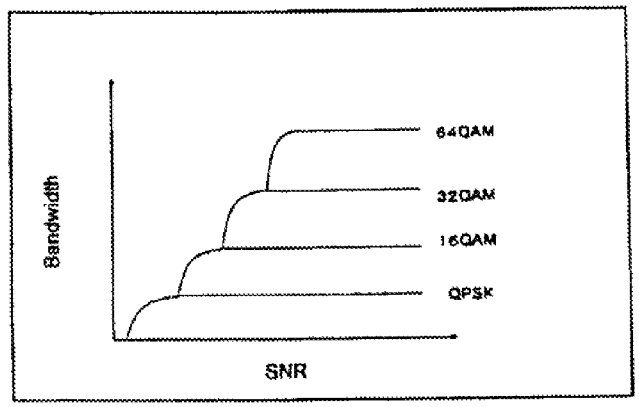
FIG. 1 is a diagram showing the correlation between the SNRs and transmission rates of modulation modes.
Figure 2:
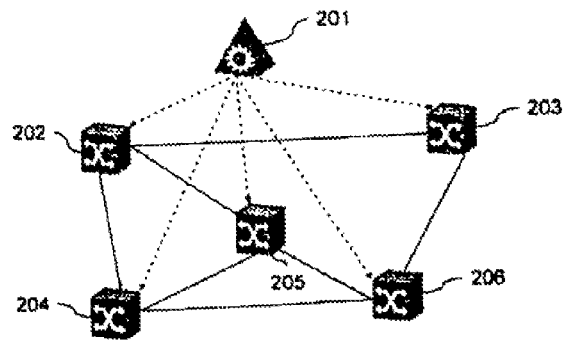
FIG. 2 is a block diagram showing an example of configuration of a network according to a first exemplary embodiment.

FIG. 2 is a block diagram showing an example of a configuration of a network according to the present exemplary embodiment. A network shown in FIG. 2 includes plurality of radio links and communication devices 202 to 206 configured to transfer packets. Path control device 201 configured to carry out path calculations is connected to each of communication devices 202 to 206 by radio or by wire. In FIG. 2, the connections between the communication devices based on radio communication are shown by solid lines. Communication devices 202 to 206 are routers or switches.

Figure 3:
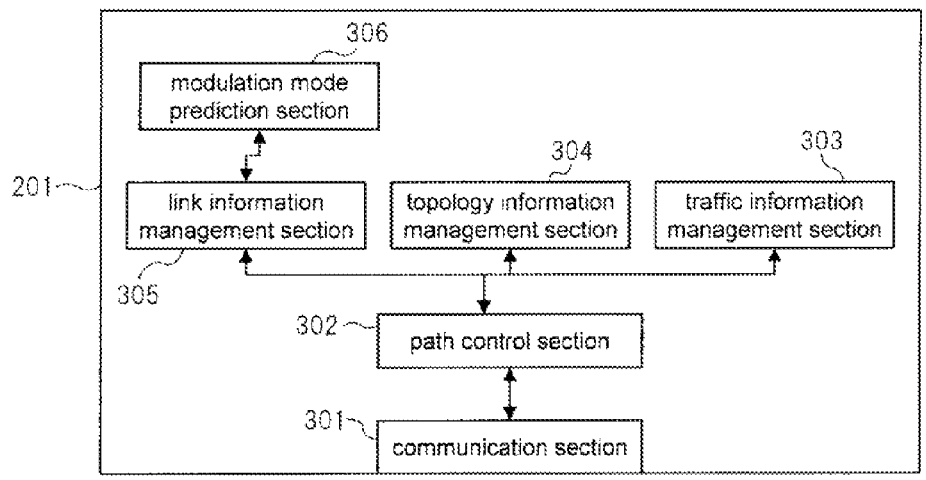
FIG. 3 is a block diagram showing an example of a configuration of a path control device according to the first exemplary embodiment.

FIG. 3 is a block diagram showing an example of a configuration of a path control device according to the present exemplary embodiment. As shown in FIG. 3, path control device 201 includes communication section 301, path control section 302, traffic information management section 303, topology information management section 304, link information management section 305, and modulation mode prediction section 306. Path control device 201 transmits and receives data to and from communication devices 202 to 206 via communication section 301.

Modulation mode prediction section 306 may carry out an estimation process by statistical calculations, regardless of what its name expresses.

Traffic information management section 303 manages traffic information including information indicating where and how much traffic is flowing through the network and information on bands used by traffic. As information indicating where and how much traffic is flowing through the network, for example, information on the sources and destinations of traffic is available.

Topology information management section 304 manages connection information including information indicating how the network is configured and on the connections between nodes.

Link information management section 305 accumulates link status information received from each of communication devices 202 to 206. Link information management section 305 manages link information including the bit error rate (BER) of each radio link and historical information on the modulation modes used by the radio link so far. Furthermore, upon receiving information on a newly predicted modulation mode from modulation mode prediction section 306, link information management section 305 passes the information to path control section 302.

Modulation mode prediction section 306 predicts the modulation mode periodically or in response to a change in traffic based on the link information managed by link information management section 305. Modulation mode prediction section 306 passes the predicted modulation mode to link information management section 305.

Upon receiving information on the newly predicted modulation mode from link information management section 305, path control section 302 references the traffic information managed by the traffic information management section 303, the connection information managed by topology information management section 304, and the link information managed by link information management section 305 to collect network information on the status and performance of the links forming the network. Path control section 302 then sets a path through which traffic flows based on the network information. Specifically, based on the network information, path control section 302 carries out a path calculation to calculate a path through which the traffic between the communication devices, for which the path is to be set, flows. Then, path control section 302 notifies communication devices 202 to 206 in the network of the path information resulting from the path calculation. Path control section 302 thus sets the traffic path for the network.

Each of path control section 302, traffic information management section 303, topology information management section 304, link information management section 305, and modulation mode prediction section 306 includes storage means (not shown in the drawings) in which information is recorded and a dedicated circuit corresponding to the operation of each section. In each section, it is possible to pre-store a program corresponding to the operation of the section in the storage means and to provide a CPU (Central Processing Unit) (not shown in the drawings), rather than to use the dedicated circuit described above. In this case, the CPU carries out processing in accordance with the program to allow each section to perform the above-described operation. Moreover, if the CPU is provided, not all the CPUs corresponding to the respective sections need to be provided.

Now, the configuration of communication devices 202 to 206 will be described. The configurations of communication devices 202 to 206 are similar. Thus, the configuration of communication device 202 will be described as representative.

Figure 4:
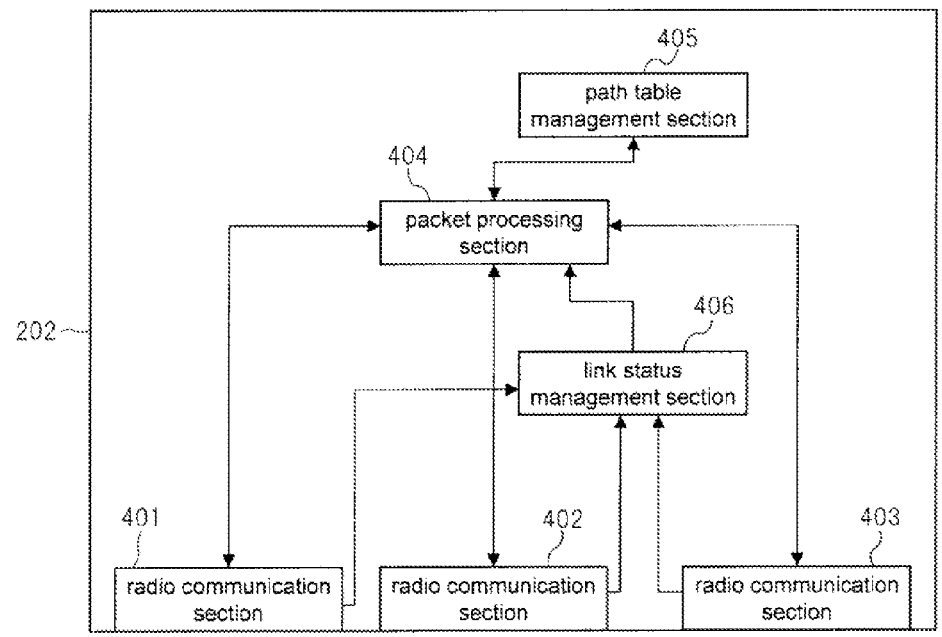
FIG. 4 is a block diagram showing an example of a configuration of a communication device according to the first exemplary embodiment.

FIG. 4 is a block diagram showing an example of a configuration of the communication device. As shown in FIG. 4, communication device 202 includes radio communication sections 401 to 403 corresponding to the plurality of radio links, packet processing section 404 configured to carry out a packet transfer process, path table management section 405 configured to manage a path table indicative of a path for packet transfer, and link status management section 406.

Each of radio communication sections 401 to 403 includes an adaptive modulation function to use a preset modulation mode as a modulation mode for the radio link or to dynamically vary the modulation mode depending on a radio environment.

Path table management section 405 manages its own path table. Upon receiving a notification of information on a new path from path control device 201, path table management section 405 updates the path table in accordance with the received notification.

Link status management section 406 records the statuses of its own radio communication sections 401 to 403 and manages link status information including the BERs of links managed by link status management section 406 and information on the modulation mode being used by each of the links. The status of each radio communication section may include information on the duration of the modulation mode used by the radio link.

Packet processing section 404 carries out a packet transfer process in accordance with the path table managed by path table management section 405. Furthermore, packet processing section 404 transmits the link status information managed by link status management section 406 to path control device 201, periodically or in response to a change in traffic.

Each of packet processing section 404, path table management section 405, and link information management section 406 includes storage means (not shown in the drawings) in which information is recorded and a dedicated circuit corresponding to the operation of each section. In each section, it is possible to pre-store a program corresponding to the operation of the section in the storage means and to provide a CPU (Central Processing Unit) (not shown in the drawings) which executes the program, rather than to use the dedicated circuit. In this case, the CPU carries out processing in accordance with the program to allow each section to perform the above-described operation.

Now, the operation of path control device 201 will be described.

Figure 5:
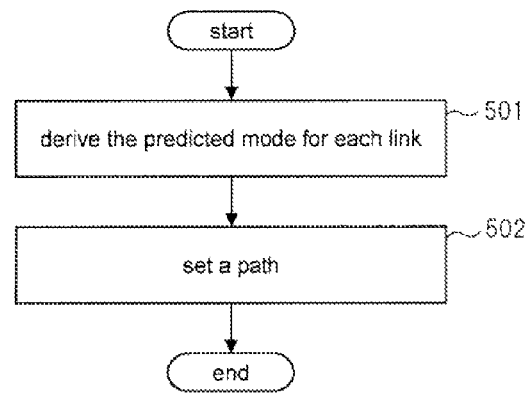
FIG. 5 is a flowchart showing an operational procedure for path setting carried out by the path control device.

FIG. 5 is a flowchart showing an operational procedure for the path control device according to the present exemplary embodiment.

Modulation mode prediction section 306 derives, periodically or in response to a change in traffic, the predicted mode that is the modulation mode predicted for a predetermined radio link based on the link information managed by the link information management section 305 (step 501). Subsequently, upon receiving the information on the predicted mode from modulation mode prediction section 306 via link information management section 305, path control section 302 determines a path for the traffic between predetermined communication devices using the predicted mode and the network information (step 502).

In the path setting procedure in step 502, path control section 302 searches for and sets a path by weighting a cost incurred by the radio link based on the transmission rate of the radio link obtained when the modulation mode is utilized and the information on the band used by the current existing traffic.

Now, the modulation mode prediction method carried out by modulation mode prediction section 306 will be described.

In the present exemplary embodiment, for predicting the minimum transmission rate estimated to be maintained in the radio link configured to carry out adaptive modulation, that is, as a method for predicting the modulation mode allowing the minimum desired communication quality to be maintained, the following roughly four methods are possible: 1) the use of the minimum rate, 2) the utilization of statistical information, 3) the utilization of past historical information, and 4) the utilization of weather prediction information.

The derivation method 1), the method of using the minimum rate, derives the predicted mode by noting that, among the modulation modes available for the radio link, at least the modulation mode which achieves the minimum transmission rate is maintained. Given that the set of the modulation modes can be denoted by M, the predicted mode is the modulation mode included in M which achieves the minimum transmission rate. Thus, the following expression is given.

$$\text{Predicted mode} = \text{Min}(M)$$

The derivation method (2), the method of utilizing statistical information, derives the predicted mode using the average and variance of the distribution of the modulation modes to be used by the radio link if the distribution has a predetermined form as in the case of, for example, a normal distribution. The average and variance correspond to distribution information, included in statistical information. Given that the average is denoted by $\mu$ and the variation is denoted by $\sigma$, the predicted mode is as follows at a probability of 99.74%.

$$\text{Predicted mode} = [\mu - 3\sigma]$$

Thus, the value of this expression is determined to be the predicted mode. In this case, [8] is a Gaussian symbol that indicates the maximum integral value that is not greater than *. Integral values are set by being pre-associated with the respective modulation modes. For example, if the modulation modes are QPSK, 16QAM, 32QAM, and 64QAM, the corresponding integral values are QPSK=1, 16QAM=2, 32QAM=3, and 64QAM=4.

The derivation method 3), the method of utilizing past historical information, may involve deriving the predicted mode using the history of modulation modes previously utilized by the radio link. It is assumed that the set of the modulation modes is denoted by M and that a portion of a given time T during which each modulation mode is used is denoted by T_m. In this case, for example, the following manner of determination is possible: predicted modes are determined for which the sum of the time T_m of each of these modulation mode and the times T_m of other modulation modes with higher transmission rates are equal to or greater than a preset threshold, and one of these modulation modes which has the largest sum is determined to be the predicted mode. Furthermore, the past BER of each modulation mode may be used as the past history to predict the modulation mode. Here, the BER is used as information indicative of an electric wave environment. However, the information is not limited to the BER but may be an SNR or a CINR (Carrier to Interference-plus-Noise Ratio). Alternatively, a plurality of these pieces of information may be combined together. The information indicative of the electric wave environment is included in the link information.

The derivation method 4) involves predicting the modulation mode using meteorological information such as pre-acquired weather information. This prediction method utilizes information on where rain falls and the positional information on the radio link to predict in advance which radio link uses which modulation mode under the effect of rain.

Now, a path setting method carried out by path control section 302 will be described.

After modulation mode prediction section 306 predicts the modulation mode for the radio link by any of the above-described methods, path control section 302 causes all the radio links eEL to incur costs. The incurred costs are expressed, for example, by:

$$1/(BW(m)-D(e)).$$

m denotes a predicted mode for a radio link e subjected to prediction. BW(m) denotes a transmission rate obtained when m is used as the modulation mode. D(e) denotes a band used by traffic utilizing the radio link e.

In this case, the method for predicting the modulation mode for each radio link is not particularly limited. Given that D(e)>BW(m), the infinity $\infty$ is provided as a cost so as to prevent the radio link from being selected. Subsequently, path control section 302 searches for a path based on the costs incurred by the links. At this time, several path search methods are possible. However, a path with the minimum cost is selected.

Now, a specific example of path setting will be described using the network shown in FIG. 2.

In the network shown in FIG. 2, if traffic with a transmission rate R is allowed to flow from communication device 202 to communication device 204, possible paths may include communication device 202-communication device 204 and communication device 202-communication device 205-communication device 204.

Here, it is assumed that the transmission rate between communication device 202-communication device 204 is varied between R/2 and 2R by adaptive modulation and that the transmission rate between communication device 202-communication device 205-communication device 204 is varied between R and 3/2R by adaptive modulation. In this case, without prediction of the transmission rate of the radio link, the path between communication device 202-communication device 204, which has a high transmission rate, is simply selected. However, thereafter, if the transmission rate between communication device 202-communication device 204 varies to R/2, the communication quality of the traffic may be degraded.

As described above, in the present exemplary embodiment, the modulation mode to be used by each radio link is predicted. Thus, instead of the path between communication device 202-communication device 204, the path between communication device 202-communication device 205-communication device 204, which maintains a transmission rate of the minimum value R, is selected. Thus the communication quality of the traffic can be guaranteed. When setting a path, if the communication quality of the traffic between the communication devices is set such that it is equivalent to or higher than that obtained before the adaptive modulation, the communication quality will be guaranteed both before and after the adaptive modulation.

Furthermore, with load distribution in units of packets, the path followed by a packet cannot be specified. It is thus difficult to guarantee communication quality, that is, to reserve a band for the traffic. However, the present exemplary embodiment allows the path through which the traffic flows to be controlled by path control. Thus, unlike the load distribution in units of packets, the present exemplary embodiment allows communication quality of the traffic to be easily guaranteed.

In the present exemplary embodiment, the modulation mode that is likely to be used by each radio link in the future is predicted. The modulation mode in which the radio link can maintain the minimum communication quality is predicted, and path control is performed based on the information. Thus, when path control is performed, a communication path using more stable radio links is selected. Furthermore, the load distribution can be provided so as to prevent traffic from being affected in spite of a decrease in the transmission rate resulting from the adaptive modulation. Moreover, the path control allows paths for packets belonging to the same flow to be controlled. This enables high quality to be achieved.

The present exemplary embodiment can be implemented in a network with a mixture of wired links and radio links. Furthermore, one or more communication devices may include the modulation mode prediction section provided in the path control device. In this case, the link status information transmitted to the path control device from the communication device includes information on the modulation mode predicted by the modulation mode prediction section.

Furthermore, path control section 302 may reference the link information collected from each communication device to predict the duration of the modulation mode based on the past status of the radio link. Path control section 302 may then reset a path for each duration. If path control is performed within the duration, changing the modulation mode may be avoided. Moreover, a plurality of path control devices may be provided and are distributed over the network.

(Second Exemplary Embodiment)

In the present exemplary embodiment, each communication device includes the functions of the path control device in the first exemplary embodiment as well. Each communication device according to the present exemplary embodiment is configured as shown in FIG. 3.

Figure 6:
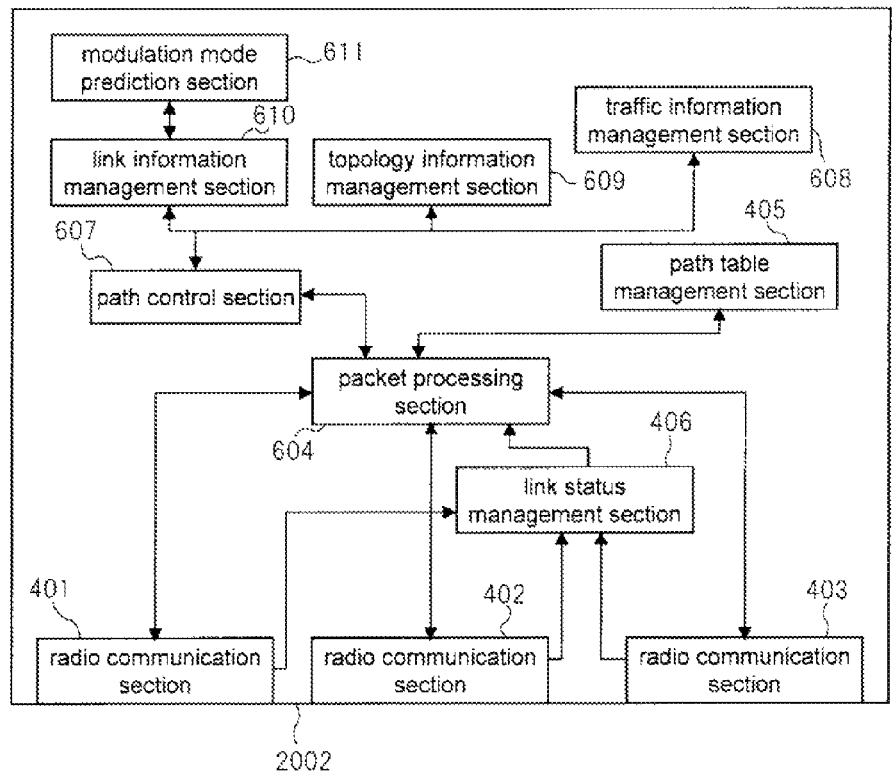
FIG. 6 is a block diagram showing an example of a configuration of a communication device according to a second exemplary embodiment.

FIG. 6 is a block diagram showing an example of a configuration of a communication device according to the present exemplary embodiment. Communication device 2002 further includes not only the configuration shown in FIG. 4 but also path control section 607, traffic information management section 608, topology information management section 609, link information management section 610, and modulation mode prediction section 611.

Here, control will also be described which is performed when receiving an admission request for permission of utilization of the network from an external. Control in response to the admission request is hereinafter referred to as admission control.

Upon an admission request message being input to radio communication section 401 via the network, the admission request message is input to path control section 607 via packet processing section 604. Upon receiving the admission request message, path control section 607 performs path control similarly to that described in the first exemplary embodiment. Thereafter, in the present exemplary embodiment, the other communication devices are notified of path information that is information on the path set by the path control.

In the present exemplary embodiment, path control can be distributively performed by a plurality of devices.

(Third Exemplary Embodiment)

In the present embodiment, if traffic has different priorities, the method for predicting the modulation mode is varied depending on the priority class of the traffic. Traffic that requires guaranteed communication quality has higher priorities.

Figure 7:
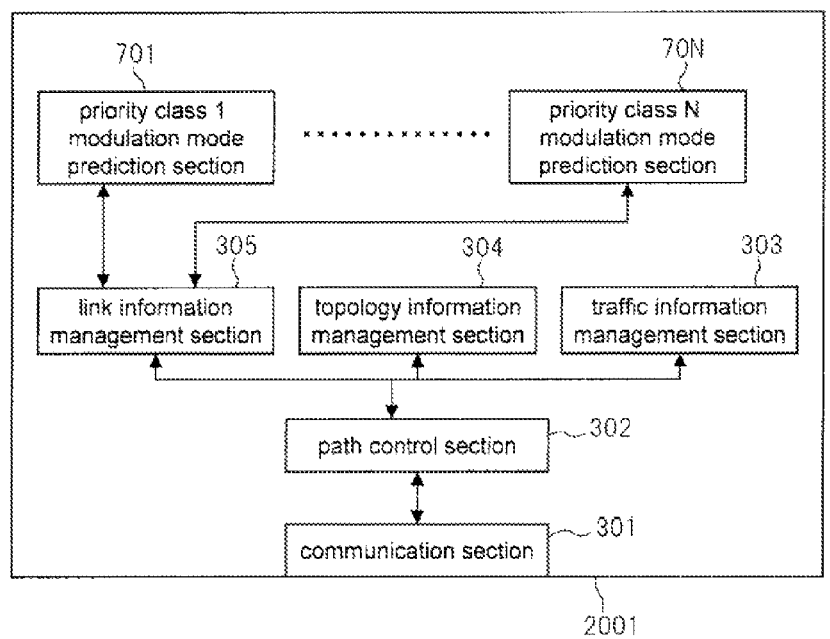
FIG. 7 is a block diagram showing an example of a configuration of a path control device according to a third exemplary embodiment.

FIG. 7 is a block diagram showing an example of a configuration of a path control device according to the present exemplary embodiment. As shown in FIG. 7, path control device 2001 includes priority class 1 modulation mode prediction section 701 to priority class N modulation mode prediction section 70N instead of modulation mode prediction section 306 shown in FIG. 3.

When a plurality of classes from a high-priority class to a low-priority class are present, path control section 302 and link information management section 305 allow each of priority class 1 modulation mode prediction section 701 to priority class N modulation mode prediction section 70N to predict the modulation mode in accordance with the rank of the priority class.

According to the present exemplary embodiment, many flows having low-priority classes are allowed to migrate through the network, with the communication quality of flows having high-priority classes maintained. That is, a mixture of traffic with different required levels of communication quality can be accepted, and the required levels of communication quality can be provided.

Furthermore, the path control allows paths for traffic to be controlled. Thus, the path control can be combined with a communication quality guarantee technique such as the priority control. This provides high-quality communication for traffic of a priority class.

(Fourth Exemplary Embodiment)

According to the present exemplary embodiment, when a path is set for traffic, a backup path that is to be used when a fault occurs is also set. A path control device according to the present exemplary embodiment is similar to that according to the first exemplary embodiment. Thus, a description of the configuration of the path control device according to the present exemplary embodiment is omitted, and operations different from those in the first embodiment will be described.

Figure 8:
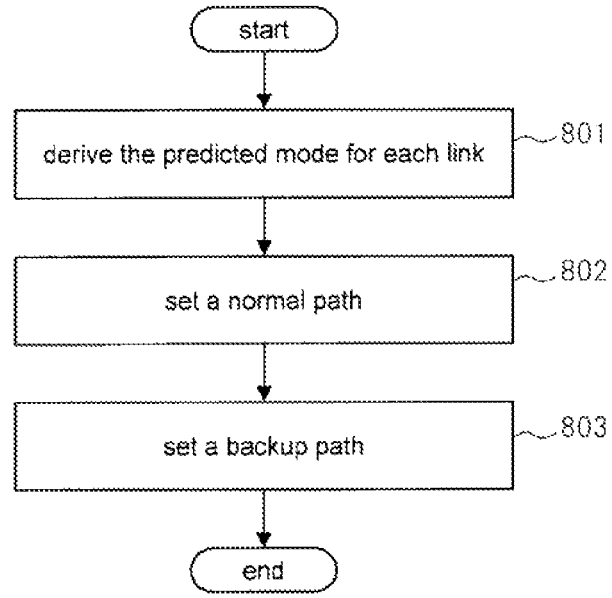
FIG. 8 is a flowchart showing an operational procedure carried out by a path control device according to a fourth exemplary embodiment.

FIG. 8 is a flowchart showing an operational procedure for the path control device according to the present exemplary embodiment. As shown in FIG. 8, as is the case with the first embodiment, modulation mode prediction section 306 predicts the modulation mode (step 801), and path control section 302 sets a path normally used (step 802). In the present embodiment, after setting the normal path, path control section 302 sets a backup path as is the case with the normal path (step 803).

As described above, besides the path actually used by the traffic, the backup path is set (step 803). Even if the backup path is set, modulation mode prediction section 306 may predict the modulation mode in which each link can maintain the minimum desired quality and reserve a band for the backup path.

In the present embodiment, the backup path to be used when a fault occurs is set. Furthermore, even when the backup path is set, the adverse effects of the adaptive modulation on the backup path can be reduced by utilizing the modulation mode determined by prediction.

Not only the first to fourth exemplary embodiments described above may be independently implemented but also a plurality of the exemplary embodiments may be combined together.

First Example

In the present exemplary embodiment, an example of admission control performed by the path control device according to the first exemplary embodiment will be described.

Figure 9:
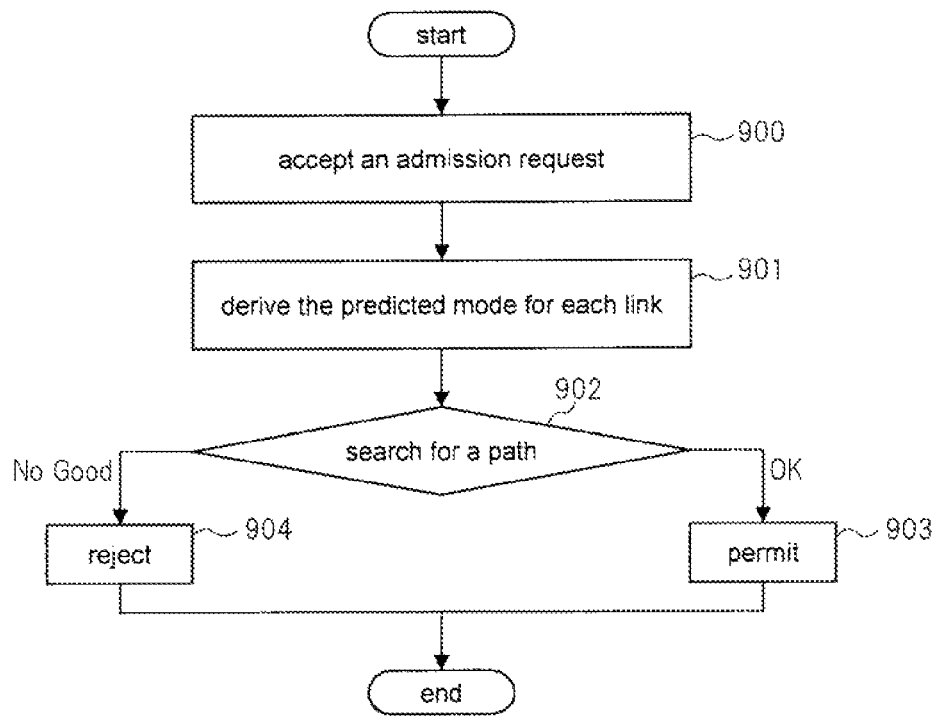
FIG. 9 is a flowchart showing an operational procedure for a path control device in a First Example.

FIG. 9 is a flowchart showing a procedure for a path control operation including the admission control.

Upon accepting an external admission request (step 900), modulation mode prediction section 306 first derives the predicted modulation mode for each radio link (step 901). Subsequently, path control section 302 searches for a path (step 902).

During the path search, path control section 302 weights the cost incurred by each link based on the communication rate of the radio link obtained while the predicted mode is in use and information on the band used by the current existing traffic. Path control section 302 searches for a path with the minimum cost except for links with no extra band sufficient to allow the traffic to pass through. If there is any such path, path control section 302 permits the admission in the request (step 903). Given that no such path is present, the admission request is rejected (step 904).

If the path search is successful, path control section 302 transmits a message of path information indicating the traffic and the path that is to be followed by the traffic, to all the communication devices on the searched path. Path control section 302 then allows each communication device to update the path table.

Figure 10:
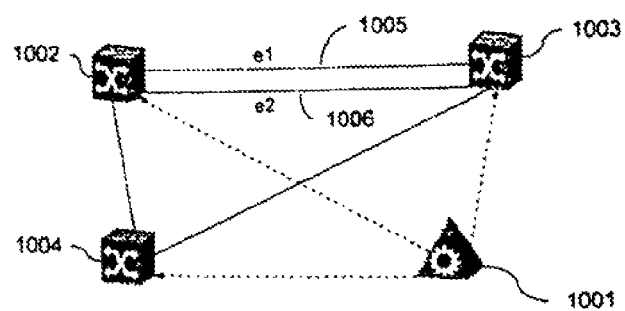
FIG. 10 is a block diagram showing an example of a configuration of a network in the First Example.

Now, operation of the path control that is carried out on the network shown in FIG. 10 will be described. As shown in FIG. 10, the network includes communication devices 1002 to 1004. Each of communication devices 1002 to 1004 is connected to path control device 1001.

Figure 11:
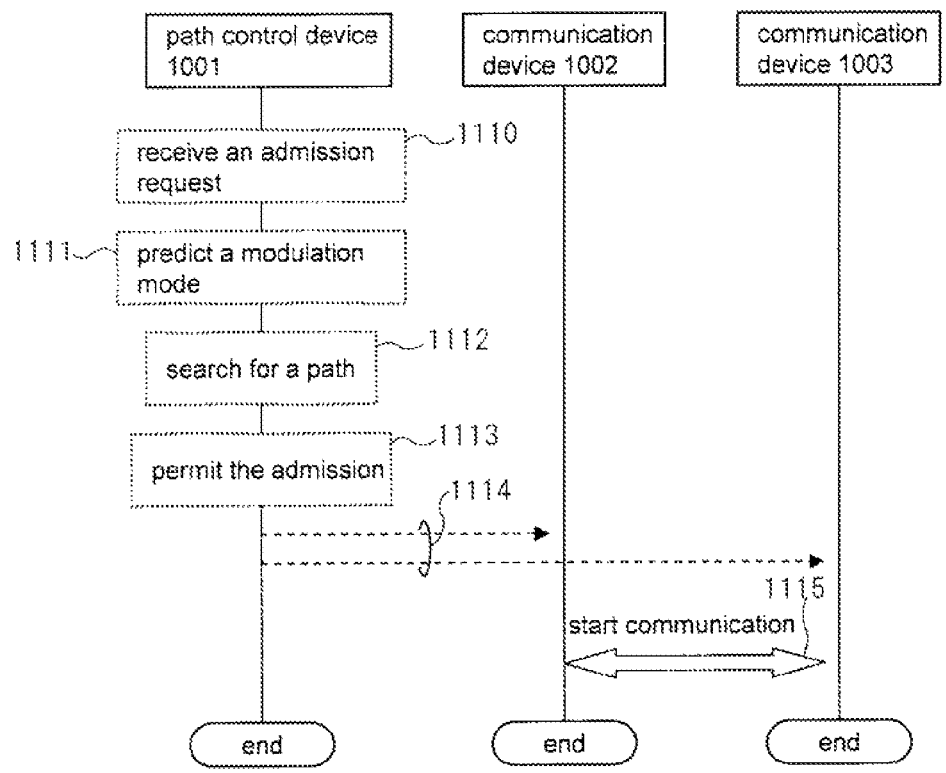
FIG. 11 is a sequence diagram showing an operational procedure of path control in the First Example.

FIG. 11 is a sequence diagram showing an operational procedure for the path control. FIG. 11 shows an example in which the path between communication device 1002 and communication device 1003 is set.

Upon receiving an external flow admission request (step 1110), path control device 1001 predicts the modulation modes for the radio links (step 1111). Thereafter, path control device 1001 searches for a path that meets the request (step 1112). If the appropriate path is found, path control device 1001 permits the admission of the requested flow (step 1113). Path control device 1001 gives notification to communication devices 1002 and 1003 on the path to urge communication devices 1002 and 1003 to update the path table (step 1114). Thereafter, communication is started (step 1115).

In the operation of predicting the modulation mode in which the operation is performed in step 1111 shown in FIG. 11, path control section 302 predicts the minimum transmission rate maintained by each radio link and the modulation mode for the radio link. However, several methods for the prediction are present. Here, the predicted value corresponds to one of the modulation modes available for each radio link which has the lowest transmission rate.

Second Example

Instead of carrying out a path calculation every time traffic occurs, the present exemplary embodiment predicts the modulation mode for each radio link, and then uses pre-acquired traffic demand information to determine all of the path for the traffic to be controlled. A path control device according to the present exemplary embodiment is similar to that according to the first exemplary embodiment. Thus, description of the configuration of the path control device according to the present exemplary embodiment is omitted, and features of the present exemplary embodiment will be described.

In the present exemplary embodiment, path control section 302 acquires the traffic demand information indicative of the expected amount of traffic from traffic information management section 303, periodically or in response to a change in traffic. The traffic demand information corresponds to data on traffic that is to be subjected to path control. Furthermore, path control section 302 uses the traffic demand information and information on the modulation mode predicted by the modulation mode prediction section 306, to set all of the paths for the traffic that is to be controlled.

Figure 12:
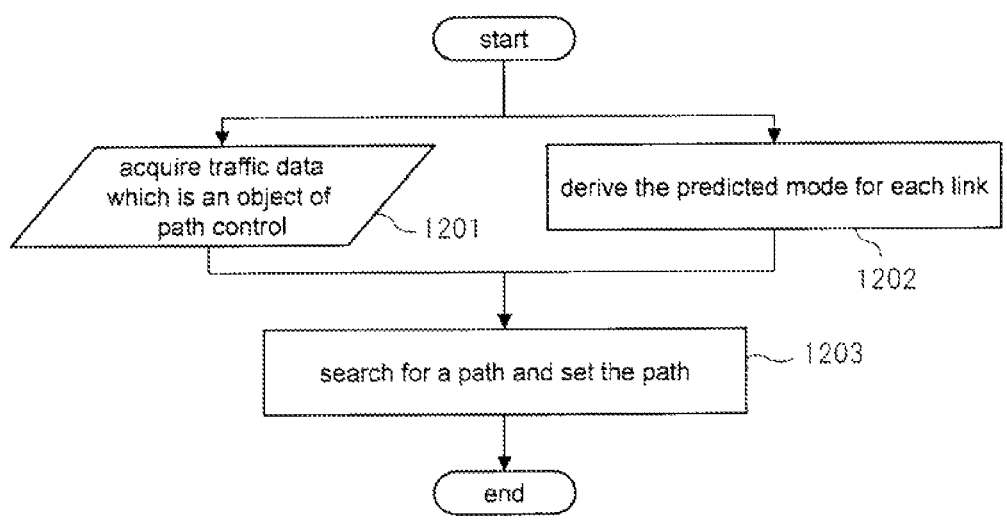
FIG. 12 is a flowchart showing an operational procedure for a path control device in a Second Example.

FIG. 12 is a flowchart showing an operational procedure for the path control device according to the present exemplary embodiment.

As shown in FIG. 12 path control device 201 acquires the traffic demand information indicative of the expected amount of traffic (step 1201). Furthermore, Path control device 201 determines the modulation mode for each radio link by prediction (step 1202). Path control device 201 uses the results in steps 1201 and 1202 to set all of paths for the traffic that is to be controlled (step 1203).

In the path setting procedure carried out in step 1203, based on the predicted modulation mode and the traffic demand information, path control section 302 sets an objective function and a constraint for a linear programming problem, and sets a path for the traffic so as to maximize or minimize the objective function. If the objective function maximizes the amount of traffic flowing through the network, then in the path setting procedure, a path allowing the traffic amount to be maximized is determined.

Third Example

The present exemplary embodiment corresponds to the second exemplary embodiment. Devices each including the path control function provided by the path control device described in the first embodiment are distributed over the network. Each of the devices performs admission control and controls paths through which traffic flow.

For example, it is assumed that communication devices 1003 and 1004 shown in FIG. 10 are configured as shown in FIG. 6. Thus, communication devices 1003 and 1004 include the path control function provided to path control device 201 according to the first exemplary embodiment. Upon accepting an admission request, each of communication devices 1003 and 1004 performs path control to search for a path for the traffic. At this time, communication devices 1003 and 1004 notify each other of the results of performing path control to exchange traffic information indicating what amount of traffic is flowing through which portion of the network.

Fourth Example

The present exemplary embodiment is an example indicating that path control operates effectively even if a plurality of priority classes are available for the traffic. In the present exemplary embodiment, a path control operation will be described which includes admission control and which is performed when the third embodiment is applied and when a total of two priority classes, that is, high-priority traffic and low-priority traffic, are present.

It is assumed that a path control device according to the present exemplary embodiment is configured as shown in FIG. 7 and that the network is configured as shown in FIG. 10. Here, a detailed description of these configurations is omitted.

The operation of path control according to the present exemplary embodiment will be described. In the present exemplary embodiment, control is performed in accordance with the procedure shown in FIG. 11. The operation of predicting the modulation mode in step 1111 is as follows. For high-priority traffic, the predicted mode is one of the modulation modes available for each radio link which has the lowest transmission rate. For low-priority traffic, the predicted mode is one of the modulation modes which is now used by the radio link.

In the present exemplary embodiment, it is assumed that communication devices 1002 and 1003 shown in FIG. 10 are connected together by two radio links e1 (reference numeral 1005 shown in FIG. 10) and e2 (reference number 1006 shown in FIG. 10). Furthermore, the modulation modes available for each radio link are assumed to be QPSK, 16QAM, 32QAM, and 64QAM. The transmission rates achieved in the respective modulation modes are assumed to be 10 Mbps, 20 Mbps, 30 Mbps, and 40 Mpbs, respectively. The operation of path setting will be described which is performed by path control section 302 when 1-Mbps traffic is newly allowed to flow between communication devices 1002 and 1003 under the above-described conditions.

If radio link e1 uses the transmission rate of 30 Mbps (32QAM) and when high-priority traffic uses a 8-Mbps link, whereas a low-priority traffic uses a 12-Mbps link, a cost w(e1) incurred by the radio link e1 is given by:

$$w(e1)=1/(BW(m)-D\_P(e)).$$

Here, D_P(e) denotes, for each traffic, a link band used by traffic with the same priority class as or a priority class higher than that of this traffic. Thus, for the high-priority class, D_P(e)=8. For the low-priority class, D_P(e)=8+12=20.

Hence, for the high-priority traffic, the cost is w(e1)=1/(10−8)=0.5. For the low-priority traffic, the cost is w(e1)=1/(30−20)=0.1.

Similarly, it is assumed that the other radio link e2 has a transmission rate of 20 Mbps (16QAM) and that the high-priority traffic uses a 2-Mbps link, whereas the low-priority traffic uses a 10-Mbps link. In this case, a, cost incurred by the radio link e2 is w(e2)=0.125 for both the high- and low-priority traffic.

In the present exemplary embodiment, as described above, free bands are present in the radio links. Thus, the traffic can be accepted. As a result, for the high-priority traffic, radio link e2 that has the lower cost is selected as the path. For the low-priority traffic, the radio link e1 that has the lower cost for the low-priority traffic is selected as the path.

Furthermore, communication devices on the path perform priority control in accordance with the priority class of the traffic to guarantee QoS.

Fifth Example

The present exemplary embodiment corresponds to the fourth exemplary embodiment, and sets, in addition to a path, a backup path. A path control device according to the present exemplary embodiment is similar to that according to the fourth exemplary embodiment. Thus, description of the configuration of the path control device according to the present exemplary embodiment is omitted.

In setting a backup path, the path control device according to the present exemplary embodiment uses the modulation mode prediction carried out to set a normal path that is normally used or newly predicts the modulation mode upon setting a backup path. Then, based on the resultant information, the path control device searches for a backup path.

An operational procedure for the path that is control device according to the present exemplary embodiment will be described with reference to a flowchart in FIG. 8. Modulation mode prediction section 306 predicts the modulation mode to be used by each link (step 801). Path control section 302 searches for and sets a normal path normally used (step 802). Then, path control section 302 uses the result of the prediction carried out in step 801 to search for and set a backup path (step 803).

Sixth Example

The present exemplary embodiment is an example in which modulation mode prediction is different from that in Exemplary Embodiments 1 and 4. A path control device according to the present exemplary embodiment is similar to that according to the first exemplary embodiment. Thus, the description of the configuration of the path control device according to the present exemplary embodiment is omitted.

The operation of the path control device according to the present exemplary embodiment will be described with reference to the flowchart shown in FIG. 5. Here, an operation in step 501 in FIG. 5 which is performed by modulation mode prediction section 306 shown in FIG. 3 will be mainly described.

In the present exemplary embodiment, it is assumed that distribution of the modulation modes to be used by radio links is pre-known. Modulation mode prediction section 306 can predict the modulation mode for the radio link by utilizing the distribution of modulation mode that is to be used by the radio link or the distribution of BERs. Modulation mode prediction section 306 utilizes the distribution of the modulation modes to operate as follows.

It is assumed that QPSK, 16QAM, 32QAM, and 64QAM correspond to QPSk=1, 16QAM=2, 32QAM=3, and 64QAM=4, respectively. The use frequency and use time of the modulation mode utilized by a certain radio link follow the normal distribution. The average is given by $\mu(e)=3$. The variance is given by $\sigma(e)=0.4$. In this case, modulation mode prediction section 306 utilizes the above-described nature to predict the modulation mode for each radio link.

In calculating a path for high-priority traffic, modulation mode prediction section 306 determines the predicted modulation mode to be $m=[\mu(e)-3\sigma(e)]$. Modulation mode prediction section 306 thus selects a modulation mode that is equal to or greater than the above-described value at a probability of at least 99.97%, as the predicted mode. Hence, the following holds true.

$$m=[3-3\times0.4]=1$$

For high-priority traffic, the predicted mode is QPSK.

Furthermore, in calculating a path for low-priority traffic, modulation mode prediction section 306 predicts the modulation mode to be $m=[\mu(e)-3\sigma(e)]$ to make the low-priority traffic more easily acceptable. This improves the utilization efficiency of the whole network. In this case, the following holds true.

$$m=[3-0.4]=2$$

Modulation mode prediction section 306 selects 16QAM as the predicted mode.

The BER is used as information indicative of the electric wave environment. However, not only BER, but also the SNR, the CINR, or a combination of a plurality of these types of information may be used.

Seventh Example

The present exemplary embodiment corresponds to a case where modulation mode prediction that is further different from those cases in Exemplary Embodiments 1, 4, and 6 is carried out and an example where past history is used. In the present exemplary embodiment, a method of predicting a future modulation mode based on the information of the modulation modes previously used by each radio link will be described. A path control device according to the present exemplary embodiment is similar to that according to the first exemplary embodiment. Thus, description of the configuration of the path control device according to the present exemplary embodiment is omitted.

The operation of the path control device according to the present exemplary embodiment will be described with reference to the flowchart shown in FIG. 5. Here, the operation in step 501 in FIG. 5 which is performed by modulation mode prediction section 306 shown in FIG. 3 will be chiefly described.

The modulation mode to be used by the radio link in the future can be predicted by carrying out calculations to determine proportions for plural types of modulation modes available for the radio link used during a past given time and the lengths of the modulation modes used during the given time.

Here, it is assumed that the modulation modes available for a certain radio link are QPSK, 16QAM, 32QAM, and 64QAM. The modulation modes used by the radio link and the time for which each of the modulation modes was used are 64QAM for two hours, 32QAM for one hour, and 16QAM one hour. In this case, the proportion for which the modulation modes account in the four-hour period are 64QAM=½, 32QAM=¼, 16QAM=¼, and QPSK=0.

Here, it is defined that the level of stability of each modulation mode is the proportion for which modulation modes equal to or greater than this modulation mode account in this modulation mode, then the levels of stability of the above-described it) modulation modes are 64QAM=½, 32QAM=¾, 16QAM=1, and QPSK=1.

Modulation mode prediction section 306 predicts the modulation mode depending on the level of stability required for the traffic. Here, modulation mode prediction section 306 selects one of the modulation modes that meets the level of stability required for the traffic which has the highest transmission rate. Thus, if the level of stability required for traffic is 1, 16QAM is selected as a predicted mode. Furthermore, if low-priority traffic requests a stability level equal to or higher than a preset threshold of 0.6, 32QAM is determined to be a predicted mode.

For high-priority traffic, a low modulation mode is predicted. Thus, unless the modulation mode is equal to or lower than QPSK, stable communication can be provided. Furthermore, for low-priority traffic, a higher modulation mode is estimated. Hence, low-priority traffic is likely to be affected by a change in the modulation mode involved in the adaptive modulation. However, free bands that are not used by the high-priority traffic are available. This enables an increase in the utilization rate of the whole network.

Eighth Example

The present exemplary embodiment is an example in which the modulation mode is predicted using the BER. The present exemplary embodiment is similar to the seventh example except for the modulation mode prediction operation. Thus, a detailed description of the configuration and operation is omitted.

In the present exemplary embodiment, in the operation in step 501 in FIG. 5, the past BERs of each radio link are used as past history. In this case, link information management section 305 collects the past BERs in each modulation mode of the radio link. Modulation mode prediction section 306 selects one of the modulation modes meeting the BER required for traffic which has the highest transmission rate.

For example, if the past BERs of the modulation modes are QPSK=$10^{-4}$, 16QAM=$10^{-3}$, 32QAM=$10^{-3}$, and 64QAM=$10^{-2}$ and the BER required for the traffic is $10^{-3}$, then modulation mode prediction section 306 selects 32QAM as a predicted value for the modulation mode.

The BER is used as communication quality information. However, the present invention is not limited to the use of the BER. The SNR, the CINR, or a combination of a plurality of these types of information may be used.

Ninth Example

The present exemplary embodiment is an example in which meteorological information is used to predict the modulation mode. The present exemplary embodiment is similar to the seventh example except for the modulation mode prediction operation. Thus, a detailed description of the configuration and operation is omitted.

According to the present exemplary embodiment, the modulation mode prediction operation in step 501 in FIG. 5 is performed as follows. To allow prediction accuracy to be improved, the modulation mode to be used by each radio link is predicted based on the distribution of rainfall intensities obtained from pre-acquired rainfall information, the migration speed of rain clouds, the predicted results of use of the path, and positional information on the radio link. The positional information on the radio link is pre-included in connection information managed by topology information management section 304. Upon determining that rain will fall on a certain radio link based on the prediction result, modulation mode prediction section 306 determines QPSK, the minimum mode for the link, to be the predicted mode.

In any of the above-described exemplary embodiments, the modulation mode to be used by the radio link is predicted, and path control is performed based on the prediction results to control the traffic flowing through the network. This enables suppression of the adverse effects, on the traffic, of a variation in transmission rate resulting from the adaptive modulation. Furthermore, the path control facilitates management of network resources, enabling more flexible control with the communication quality of the whole network being maintained.

INDUSTRIAL APPLICABILITY

The present invention is applicable to a radio broad band system and a mobile network system both formed of radio links.

As an example of the effect of the present invention, by predicting modulation modes used by radio links, path control can be performed based on the prediction results to control traffic flowing through the network. Thus, the adverse effects, on traffic, of a variation in transmission rate resulting from adaptive modulation can be suppressed.

The present invention has been described above with reference to the exemplary embodiments. However, the present invention is not limited to the above-described exemplary embodiments. Various changes understandable to those skilled in the art may be made to the configuration and details of the present invention without departing from the scope of the present invention This application is based upon and claims the benefit of priority from Japanese Patent Application No. 2008-201758 filed on Aug. 5, 2008, the content of which is incorporated by reference.

Reference Signs List 201, 1001 Path control devices
202 to 206 and 1002 to 1004 Communication devices
302 Path control section
306 Modulation mode prediction section

The invention claimed is:

1. A path control system comprising:
a network including communication devices that communicate via a radio link that uses adaptive modulation; and
a path control device predicting a future modulation mode for the radio link and setting a communication path for the network based on a predicted mode that is the predicted modulation mode, wherein
upon externally receiving an admission request for permission of utilization of the network, the path control device predicts the modulation mode for the radio link, searches for the communication path that meets the admission request based on the predicted mode, permits the admission request if an appropriate path is found, and transmits path information indicating traffic, which corresponds to the admission request, and the communication path used for transmission, to all communication devices on the communication oath in order to allow each communication device to update a path table,
wherein the path control device predicts the modulation modes corresponding to priority classes to which a plurality of the traffic belongs respectively, assumes that a cost is w, that a transmission rate is BW, and that a band used by the traffic is D, corresponding to each of the priority classes, estimates the cost by an equation, w=1/(BW−D), corresponding to the radio link based on each of the priority classes, and sets the communication path in accordance with each of the priority classes so as to minimize the cost.

2. The path control system according to claim 1, wherein in setting the communication path based on the predicted mode, the path control device sets the communication path so that the traffic will have communication quality equivalent to or higher than communication quality achieved before the communication path is set.

3. The path control system according to claim 1, wherein the path control device sets a backup path for the network in addition to the communication path, using the predicted mode.

4. The path control system according to claim 1, wherein the path control device determines the predicted mode for the radio link based on a history of modulation modes previously used by the radio link or on a history of information indicative of an electric wave environment of the radio link.

5. The path control system according to claim 1, wherein the path control device predicts the modulation mode for the radio link in association with meteorological information at a position of the radio link.

6. A path control device comprising:
a modulation mode prediction section predicting a future modulation mode for a radio link that uses adaptive modulation in a network including communication devices that communicate via the radio link; and a path control section setting a communication path for the network based on a predicted mode that is the predicted modulation mode, wherein upon externally receiving an admission request for permission of utilization of the network, the path section predicts the modulation mode for the radio link, searches for the communication path that meets the admission request based on the predicted mode, permits the admission request if an appropriate path is found. and transmits path information indicating traffic, which corresponds to the admission request, and the communication path used for transmission, to all communication devices on the path in order to allow each communication device to update a path table, wherein the modulation mode prediction section predicts the modulation modes corresponding to priority classes to which a plurality of the traffic belongs respectively, and the path control section assumes that a cost is w, that a transmission rate is BW, and that a band used by the traffic is D, corresponding to each of the priority classes, estimates the cost by an equation, $w=1/(BW-D)$, corresponding to the radio link based on each of the priority classes, and sets the communication path in accordance with each of the priority classes so as to minimize the cost.

7. The path control device according to claim 6, wherein in setting the communication path based on the predicted mode, the path control section sets the communication path so that the traffic will have communication quality equivalent to or higher than communication quality achieved before the communication path is set.

8. The path control device according to claim 6, wherein the path control section sets a backup path in addition to the communication path, using the predicted mode for the network.

9. The path control device according to claim 6, wherein the modulation mode prediction section determines the predicted mode for the radio link based on a history of modulation modes previously used by the radio link or on a history of information indicative of an electric wave environment of the radio link.

10. The path control device according to claim 9, wherein when the predicted mode is determined, the predicted mode is determined using statistical distribution information based on the history of the modulation modes or on the history of the information indicative of the electric wave environment.

11. The path control device according to claim 9, wherein the information indicative of the electric wave environment includes at least one from among a BER, an SNR, and a CINR.

12. The path control device according to claim 6, wherein the modulation mode prediction section predicts the modulation mode for the radio link in association with meteorological information at a position of the radio link.

13. A path control method comprising:
predicting a future modulation mode for a radio link that uses adaptive modulation in a network including communication devices that communicate via the radio link, upon externally receiving an admission request for permission of utilization of the network;

searching for a communication path that meets the admission request based on a predicted mode that is the predicted modulation mode;

permitting the admission request, if an appropriate path is found; and transmitting path information indicating traffic, which corresponds to the admission request, and the communication path used for transmission, to all communication devices on the path in order to allow each communication device to update a path table, wherein when the modulation mode is predicted, predicting modulation modes corresponding to priority classes to which a plurality of the traffic belongs respectively, assuming that a cost is w, that a transmission rate is BW, and that a band used by the traffic is D, corresponding to each of the priority classes, estimating the cost by an equation, $w=1/(BW-D)$, corresponding to the radio link based on each of the priority classes, and setting the communication path in accordance with each of the priority classes so as to minimize the cost, when the communication path is set.

14. The path control method according to claim 13, wherein when the communication path is set based on the predicted mode, the communication path is set so that the traffic will have communication quality equivalent to or higher than communication quality achieved before the communication path is set.

15. The path control method according to claim 13, wherein when the communication path is set, in addition to the communication path, a backup path is set using the predicted mode.

16. The path control method according to claim 13, wherein when the modulation mode is predicted, the predicted mode for the radio link is determined based on a history of modulation modes previously used by the radio link or on a history of information indicative of an electric wave environment of the radio link.

17. The path control method according to claim 13, wherein when the modulation mode is predicted, the modulation mode for the radio link is predicted in association with meteorological information at a position of the radio link.

18. The path control system according to claim 1, wherein the priority classes comprise high-priority traffic and low-priority traffic, and the predicted mode for the high-priority traffic is a modulation mode which has the lowest transmission rate, from among modulation modes available for the radio link, and the predicted mode for the low-priority traffic is a modulation mode which is currently used by the radio link.

19. The path control device according to claim 6, wherein the priority classes comprise high-priority traffic and low-priority traffic, and the predicted mode for the high-priority traffic is a modulation mode which has the lowest transmission rate, from among modulation modes available for the radio link, and the predicted mode for the low-priority traffic is a modulation mode which is currently used by the radio link.

20. The path control method according to claim 13, wherein the priority classes comprise high-priority traffic and low-priority traffic, and the predicted mode for the high-priority traffic is a modulation mode which has the lowest transmission rate, from among modulation modes available for the radio link, and the predicted mode for the low-priority traffic is a modulation mode which is currently used by the radio link.

* * * * *